(12) United States Patent
De'Longhi

(10) Patent No.: US 8,993,025 B2
(45) Date of Patent: Mar. 31, 2015

(54) FRYER AND PROCEDURE FOR COOKING IN A SMALL VOLUME OF OIL

(75) Inventor: Giuseppe De'Longhi, Treviso (IT)

(73) Assignee: De' Longhi Appliances S.R.L., Treviso (IT)

( * ) Notice: Subject to any disclaimer, the term of this patent is extended or adjusted under 35 U.S.C. 154(b) by 596 days.

(21) Appl. No.: 12/786,949

(22) Filed: May 25, 2010

(65) Prior Publication Data

US 2010/0303986 A1 Dec. 2, 2010

(30) Foreign Application Priority Data

May 27, 2009 (EP) .................................... 09425210

(51) Int. Cl.
*A23L 1/01* (2006.01)
*A47J 37/12* (2006.01)

(52) U.S. Cl.
CPC .......... *A47J 37/1214* (2013.01); *A47J 37/1209* (2013.01); *A47J 37/128* (2013.01); *A47J 37/129* (2013.01); *A47J 37/1295* (2013.01)
USPC ........... 426/438; 426/519; 426/521; 426/523; 99/409; 99/339; 99/473; 99/474; 99/477; 99/478; 99/479

(58) Field of Classification Search
USPC ............ 426/438, 521, 519, 523; 99/409, 348, 99/339, 473, 474, 476, 477, 478, 479
See application file for complete search history.

(56) References Cited

U.S. PATENT DOCUMENTS

| 5,027,697 A | * | 7/1991 | De Longhi | 99/409 |
| 5,352,037 A | * | 10/1994 | Jouvin | 366/219 |
| 5,906,432 A | * | 5/1999 | Wade et al. | 366/97 |
| 6,698,420 B2 | * | 3/2004 | Anthony | 126/381.1 |
| 2009/0220658 A1 | * | 9/2009 | Al-Asaad | 426/417 |
| 2010/0028514 A1 | | 2/2010 | Goderiaux et al. | |

FOREIGN PATENT DOCUMENTS

| FR | 2896677 A2 | 8/2007 |
| WO | 2005063097 A2 | 7/2005 |

* cited by examiner

*Primary Examiner* — Drew Becker
*Assistant Examiner* — Preston Smith
(74) *Attorney, Agent, or Firm* — Volpe and Koenig, P.C.

(57) ABSTRACT

A fryer is provided for cooking food in a small volume of oil. The fryer includes a main body with a seat for supporting a tilted tank designed to contain the volume of oil in a bottom angular portion thereof. The fryer also includes a heater, and at least one mixing blade inside the tank.

14 Claims, 4 Drawing Sheets

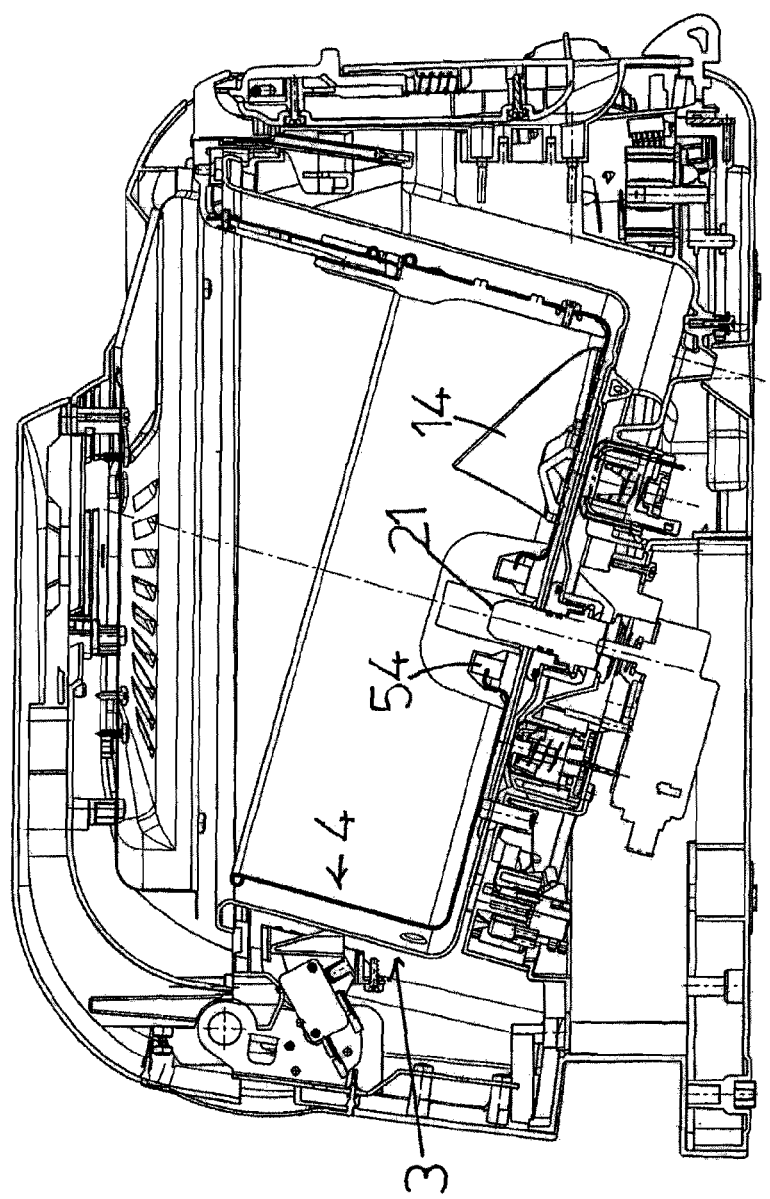

FRYER AND PROCEDURE FOR COOKING IN A SMALL VOLUME OF OIL

FIELD OF THE INVENTION

The present invention refers to a fryer and to a procedure for cooking food, and French fries in particular, in a small volume of oil.

BACKGROUND

Nowadays there are various known types of fryer for cooking food. A first type of fryer for cooking with oil comprises a tank lying on a horizontal or tilted axis containing a revolving basket. In this case, while it is cooking, the food remains permanently and completely immersed in an oil bath heated by an electric heating element located underneath the bottom of the tank.

A different type of fryer has also been proposed for cooking in air, wherein the food is placed inside a tank lying on a horizontal axis and containing a thin film of oil. Inside the tank, a rotating mixer blade stirs the food in order to coat it with oil as it is being cooked by the forced circulation of a flow of hot air through the tank.

A drawback of the first type of fryer lies in that the cooking is done in an excessive volume of oil, which not only gives rise to a waste of oil by comparison with the amount really needed, but also generally alters the fragrance and other sensory features required of the end product.

The second type of fryer enables oil savings and a healthier cooking action, but it suffers from a limited efficiency and also fails to achieve the required sensory characteristics and fragrance.

The technical aim of the present invention is consequently to achieve a fryer and a frying procedure that enable the technical drawbacks of the known state of the art to be overcome.

SUMMARY

Within the context of this technical aim, one object of the invention is to achieve a fryer and a cooking procedure that enables the food to achieve the required sensory features with a minimum oil consumption.

Another object of the invention is to achieve a fryer and a cooking procedure that are extremely versatile, efficient and highly productive.

Another, not necessarily last object of the invention is to achieve a fryer that is sturdy, compact, and structurally and functionally straightforward but reliable.

The technical aim, together with these and other objects according to the present invention, are achieved by a fryer and a cooking procedure according to the independent claims stated below.

Other characteristics of the present invention are stated, moreover, in the dependent claims.

With reference, in particular, to the case of food in small pieces, such as French fries, it should be noted that the mixer blade not only stirs and displaces the French fries in the basket, so that they are repeatedly first immersed in the oil bath and then exposed to the hot air, it also spreads a film of oil all over the bottom of the basket (even on the part of the bottom of the basket that is not immersed in the volume of oil) so that cooking can continue outside the volume of oil by the combined action of both the film of oil on the bottom of the basket and the hot air contained inside the tank, in the case of the fryer being fitted with a lid. It should be noted, in particular, that the pieces of food continue to cook outside the volume of oil due to their direct contact with the bottom of the basket, which is heated and coated with oil.

The efficacy of the cooking process is also markedly improved by the fact that the food is moved due both to the simple effect of gravity, because the basket is tilted, and to the mechanical effect of a selective or combined action of the blade and the basket. As they move, all the pieces of food being cooked are thus evenly exposed to the different sources of heat, thereby obtaining an extremely uniform cooking action.

BRIEF DESCRIPTION OF THE DRAWINGS

Further characteristics and advantages of the invention will emerge more clearly from the following description of preferred, but not exclusive embodiments of the fryer according to the invention, illustrated as nonlimiting examples in the attached drawings, wherein:

FIG. 4 shows a perspective cross-sectional view of a fryer according to a third preferred embodiment of the invention.

DETAILED DESCRIPTION OF THE PREFERRED EMBODIMENTS

Figure 1:
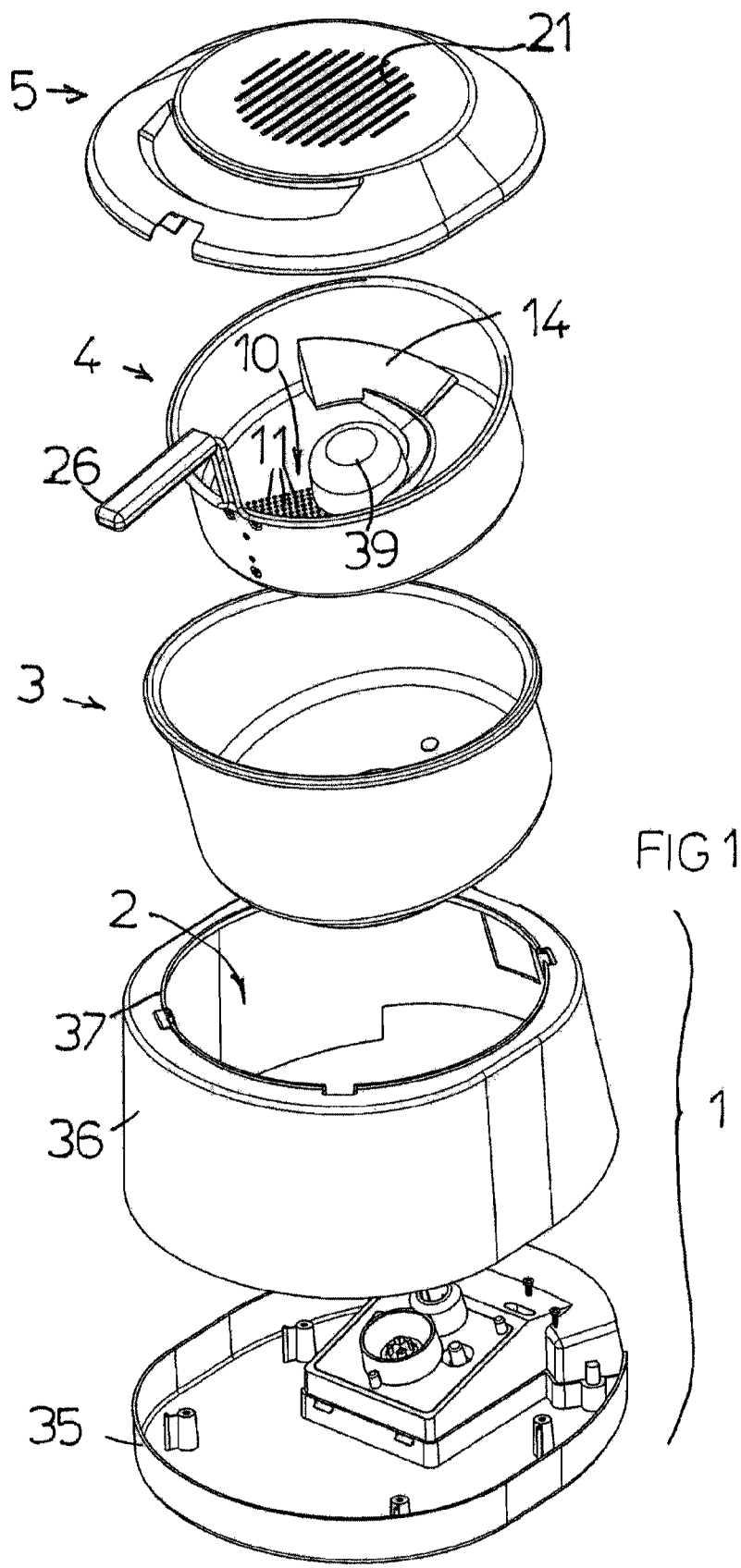
FIG. 1 shows a perspective exploded view of a fryer according to the invention.

Equivalent parts in the various embodiments of the invention are identified by the same reference numbers.

With reference to the above-mentioned figures, the fryer for cooking food in a small volume of oil comprises a main body 1 with a seat 2 for supporting a tank 3 tilted so as to collect a volume of oil 7 in its bottom angular portion 9.

The fryer preferably comprises a lid 5 supported on the main body 1 so as to occupy an open position and a closed position of the tank 3. A basket 4 is removably positioned inside the tank 3.

A heater 6 is also provided, and there is at least one mixer blade 14 inside the tank 3, and particularly inside the basket 4 contained in the tank 3.

The blade 14 is configured at least so as to bring at least a portion of the food into contact with the volume of oil 7 and thereby submit the food to a combined cooking action due to the effect of the thermal energy directly or indirectly transmitted by the heater 6 at least to the volume of oil 7 and to the tank 3, and the basket 4, in particular, as well as to the volume of air 8, contained inside an air chamber 13 formed between the lid 5 and the tank 3, in the version of fryer that includes a lid.

In particular, the blade 14 is also suitable for coating the part of the bottom of the basket 4 beyond the volume of oil 7 with a film of oil so that the whole area of the bottom of the basket 4 contributes actively towards cooking the food.

The basket 4 comprises openings 11 coinciding with at least the part 10 coinciding with the bottom angular portion 9 of the tank 3.

The tank 3 and the basket 4 have a tilted central axis 15 in common. In particular, the tank 3 and the basket 4 have cylindrical lateral surfaces, 16 and 17, and a bottom, 12 and 18, tilted at the same angle, and a horizontal upper edge, 19 and 20.

The common central axis 15 for the tank 3 and the basket 4 preferably tilts at an angle of between 50° and 80° with respect to the horizontal plane on which the fryer stands.

In particular, the main body 1 comprises two main parts, i.e. a flat base 35 for resting the fryer on a worktop, and a shell 36 installed on the flat base 35 and suitable for supporting the tank 3.

In line with its open top, the shell 36 has a flange 37 resting on the tank 3, the bottom 12 of which is attached to a tilting bracket 38 that extends from the base 35.

According to an important aspect of the invention, the blade 14 and the basket 4 are supported so that they remain free to rotate, selectively or in combination, around the tilted axis 15.

In particular, it may be that only the blade 14 rotates, or that only the basket 4 rotates, or again that the blade 14 and the basket 4 rotate simultaneously, either in the same direction or in opposite directions.

Moreover, the blade 14 and the basket 4 may have the same or a different rate of rotation.

In particular, the blade 14 and the basket 4 may have the same or a different rate of rotation both when they turn in the same direction and when they turn in opposite directions.

In a particular case, the blade 14 and the basket 4 may rotate in unison, i.e. they turn simultaneously at the same rate and in the same direction.

The fryer naturally has a rotator for enabling the rotation of the blade 14 and/or of the basket 4.

In the embodiments illustrated, the rotator comprises a motorized drive pin 21 for inducing a rotary displacement of the blade 14.

Underneath the bottom 12 of the tank 3, there is a geared motor 28 for the blade driving pin 21.

The driving pin 21 extends inside the basket 4 through a central hole 21 in the bottom 12 of the tank 3, and through a central hole 23 in the bottom 18 of the basket 4. The driving pin 21 is contained inside a bushing 30, which is in turn associated with the hole 22. The bushing 30 ensures that the driving pin 21 remains centred inside the hole 22 and, by suitable gaskets 33, it also provides an oil tight seal to prevent any contamination of the geared motor 28.

The geared motor 28 is likewise separated from the bottom of the tank 3 by a plate-shaped protective shield 34. The blade 14 has a central dome 39 with its perimeter in contact with the basket 4 along a closed line surrounding the central hole 23 in the basket 4.

To ensure the transmission of the movement to the blade 14, on the inside of the dome 39 there is a central sleeve 40 for the removable coupling of the driving pin 21.

To ensure a seal at the coupling between the sleeve 40 and the driving pin 21, a gasket may be inserted between the parts.

The lid 5 has slits 24 for air venting purposes. The edge around the perimeter of the lid 5 has a lip-shaped gasket 25 that forms a seal with the upper edge of the tank 3.

The basket 4 has a handle 26 that extends on the outside of the main body 1 from a position diametrically opposite to one in which there is a pin 27 enabling the articulated connection of the lid 5 to the main body 1.

The handle 26 may have a hinge 41 enabling a configuration with limited overall dimensions, in which it is folded back inside a recess 42 in the main body 1 during the cooking process.

The heater 6 is located at least underneath the bottom 12 of the tank 3.

The heater 6 comprises electric heating elements and, in particular, comprises at least one electric heating element 29 in contact with the area at the bottom 12 of the lower angular portion 9 of the tank 3.

Of course, the electric heating element 29 may also extend advantageously beyond the lower angular portion 9 of the tank 3 in order to directly heat the whole area of the bottom 12 of the tank 3 so as to obtain an effective heating by convection on the bottom 18 of the basket 4, which lies up against the bottom 12 of the tank 3.

In a different embodiment of the present invention, not shown herein, there may also be at least one fan for creating a forced circulation of a flow of hot air through the tank 3.

The fan may, for instance, be integrated in the lid 5.

In this case, the heater 6 preferably also comprises at least one electric heating element placed in front of the fan so as to heat the flow of air generated by the fan.

Figure 2:
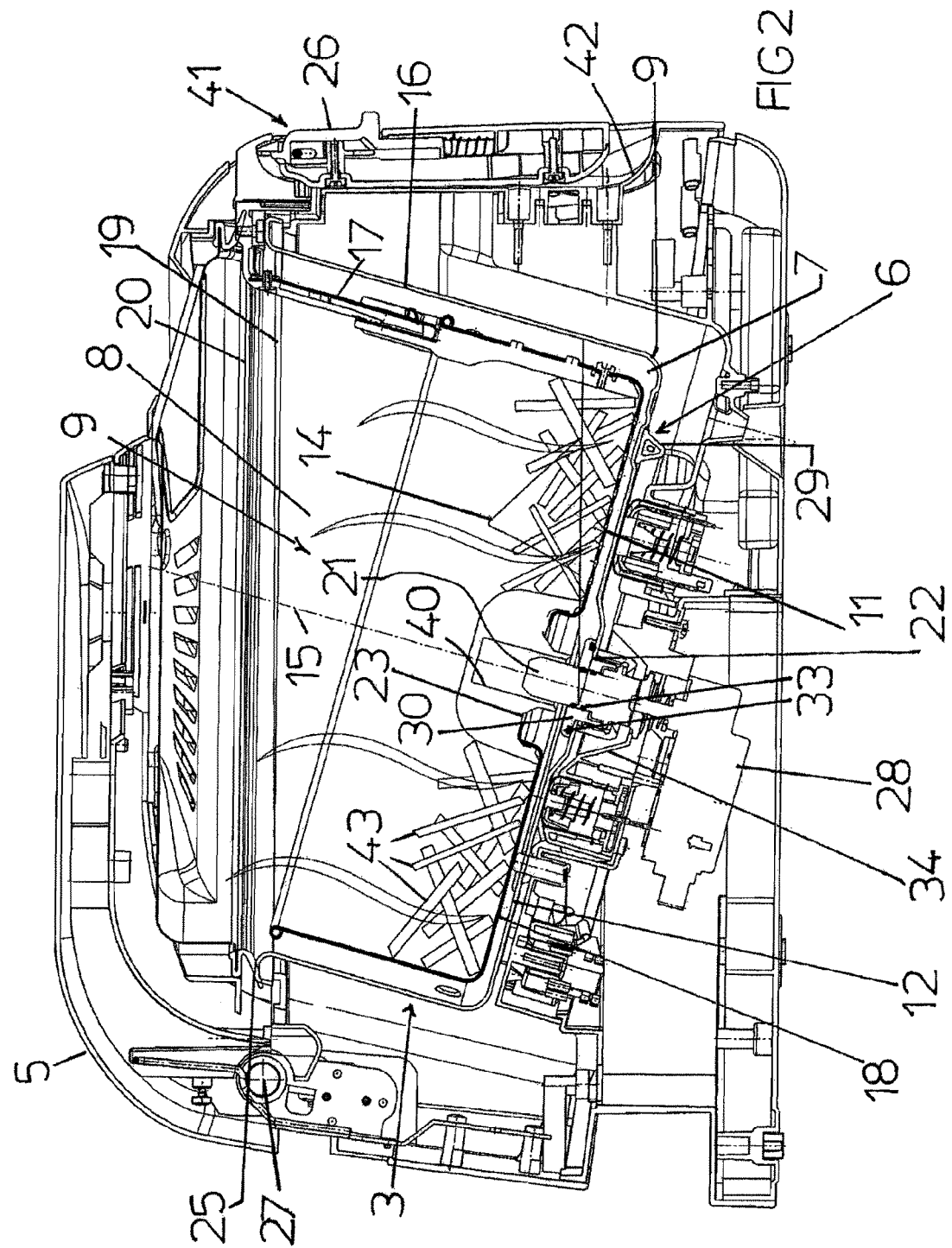
FIG. 2 shows an assembled view of the fryer in FIG. 1, in a cross-section through its vertical diameter.

With reference to the embodiment illustrated in FIGS. 1 and 2, it is only the mixer blade 14 that can rotate inside the tank 3.

Figure 3:
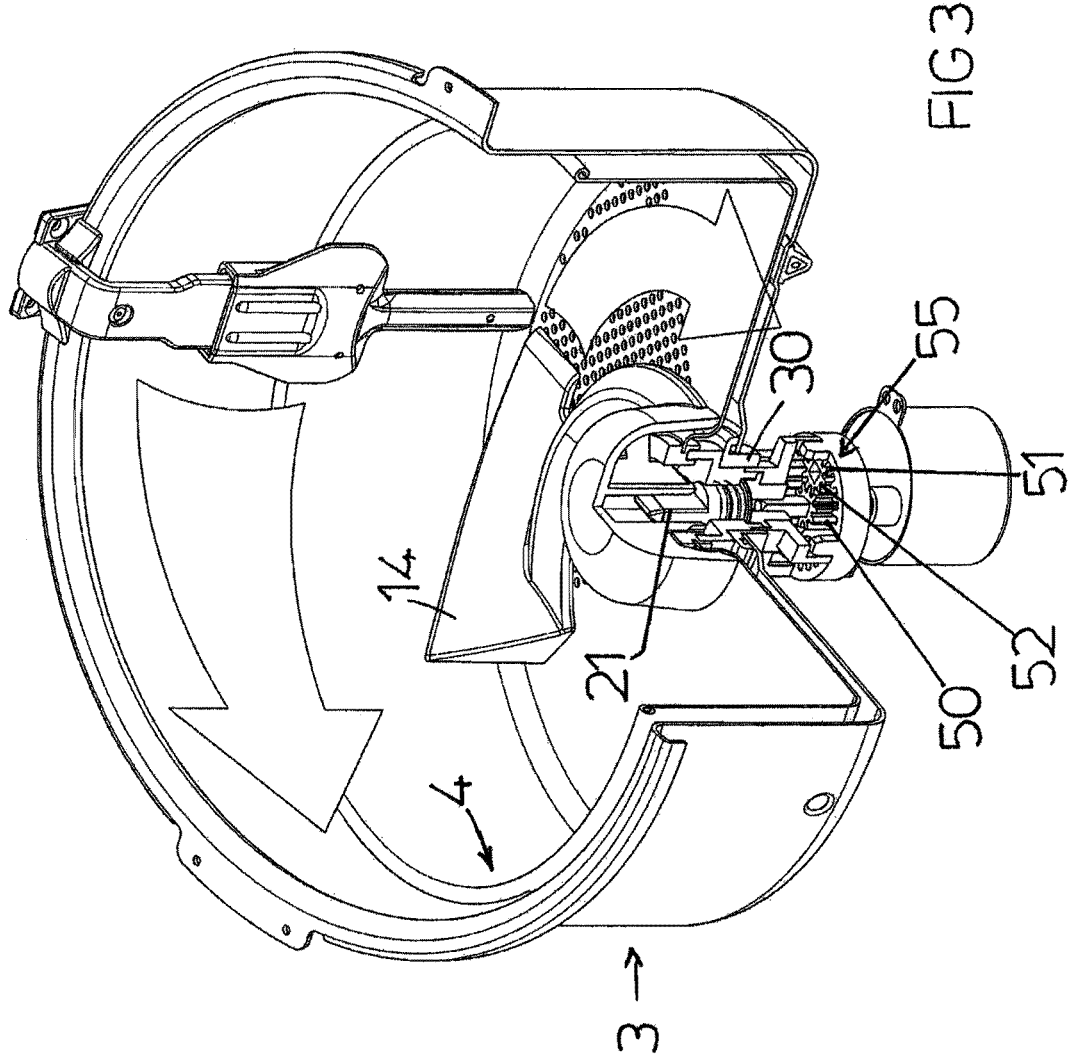
FIG. 3 shows a perspective cross-sectional view of a fryer according to a second preferred embodiment of the invention.

In the embodiment in FIGS. 3 and 4, the rotator comprises a mechanism for converting the rotation of the mixer blade 14 into a concordant or discordant, coaxial rotation of the basket 4.

FIG. 3 shows the converter mechanism as comprising a planetary gear that converts the rotation of the blade 14 into a rotation of the basket 4 in the opposite direction, which thus causes an increase in the mixing speed.

The planetary gear comprises a central toothed wheel 50 surrounded by an internally-toothed coaxial crown 51, and a pinion 52 engaging with the central wheel 50 on one side and with the crown 51 on the other to enable the transmission of the motion from one to the other. The toothed wheel 50 is keyed to the axis of driving pin 21, while the crown 51 is integrally attached to the basket 4.

FIG. 4 shows the converter mechanism as comprising a freewheel mechanism 54 that connects the blade 14 to the basket 3 so that when the blade 14 rotates in one direction it engages with the basket 3 and entrains it in a like rotation, whereas when it rotates in the opposite direction it remains disengaged from the basket, which consequently remains at a standstill. The system can be used preferentially for cooking fragile products.

The procedure for cooking with the fryer illustrated in FIGS. 1 and 2, with reference to the cooking of French fries 43 for instance, is briefly as follows.

First of all, the oil is poured into the angular portion 9 of the tank 3, which is tilted at a given angle (e.g. 100/200 cm$^3$) so at to obtain the required oil level without having to use a large volume of oil.

The volume of oil 7 is preferably the one needed to fill the bottom angular portion 9 of the tank 3 substantially up to the level of the diameter of the tank 3, as shown in FIG. 2.

The French fries 43 are then placed in the perforated basket 4.

The oil comes up to a higher level than the bottom of the basket 4 and consequently penetrates inside the basket through the holes 11, partially submerging the potatoes contained in the basket 4.

The lid 5 is closed and the heater 6 is switched on, and the rotation of the blade 14 is enabled.

In addition to moving the potatoes 43 inside the basket 4, which naturally remains at a standstill, the blade 14 also entrains a part of the oil, thereby applying a film of hot oil over the portion of the bottom 18 of the basket 4 that comes above the level of the oil contained in the tank 3 and also the French fries 43 occupying said portion of the bottom 18 of the basket 4.

Basically, as they are stirred inside the basket 4, the potatoes 43 are repeatedly completely immersed in the volume of oil 7, completely removed from the volume of oil 7, or partially immersed in and partially removed from the volume of oil 7.

In any case, the blade 14 enables all the food to be immersed in the oil, which could not happen in static conditions because of the limited amount of oil being used.

This mixing action is made more effective by the natural tendency of the potatoes to slide towards the bottom of the basket 4 due to the effect of gravity.

The potatoes 43 are cooked consequently not only by the oil bath, but also by the film of oil with which they are coated when outside the oil bath, and by their exposure to the hot air when outside the oil bath.

When the food is cooked, the basket 4 is raised and the oil can drain through the holes 11 to drop back into the angular bottom portion 9 of the tank 3.

The procedure for cooking food with a fryer of the type shown in FIG. 3 differs in that the blade 14 and the basket 3 rotate in opposite directions during the mixing process.

The procedure for cooking food with a fryer of the type shown in FIG. 4 differs in that the blade 14 can rotate alone or in unison with the basket. In this case, provision can also be made for a combined cooking method, wherein a part of the cooking cycle includes the rotation of the blade 14 alone, and another involves reversing the sense of rotation of the geared motor to enable the blade 14 and the basket 3 to rotate in unison.

Of course, as emerges clearly from the description, it is possible to make the blade and the basket rotate separately or in combination, in the same or in the opposite direction, and with the same or two different rates of rotation, depending on the application.

The fryer thus conceived may undergo numerous modifications and variants, all coming within the scope of the inventive concept; moreover, all the component parts may be replaced by other, technically equivalent elements.

In practice, any materials may be used, and in any sizes according to need and the state of the art.

What is claimed is:

1. A fryer, for cooking food in a moderate volume of oil (7), comprising a main body (1) with a seat (2) for supporting a tank (3) tilted suitably so as to collect said volume of oil (7) in a bottom angular portion (9) thereof, a heater (6), a basket (4) inside said tank (3) at least one mixer blade (14) configured so as to bring at least a part of said food into contact with said volume of oil (7) in order to submit the food to a combined cooking action due to the effect of the thermal energy directly or indirectly transmitted by said heater (6) at least to said volume of oil (7) and said tank (3), the fryer further comprising a rotator for inducing rotation of said blade (14) and of said basket (4), said at least one mixer blade (14) is installed inside said basket (4), which is in turn placed removably inside said tank (3), the fryer further comprising a lid (5) configured to form, together with said tank (3), a chamber (13) containing a volume of air (8) to which said heater (6) directly or indirectly transmits thermal energy to complete said combined cooking action said heater (6) comprises at least one electric heating element located underneath a bottom portion (12) of said tank (3), the fryer further comprises at least one fan integrated in the lid (5) for inducing forced circulation of a flow of hot air through said tank (3), said heater (6) comprising at least one electric heating element positioned in front of said fan so as to heat said flow of hot air, wherein the hot air flow directly cooks a part of said food, which is not in contact with said oil (7).

2. A fryer for cooking food according to claim 1, wherein said tank (3) and said basket (4) have a tilted central axis (15) in common.

3. A fryer for cooking food according to claim 1, wherein said blade (14) is capable of rotation around said tilted axis (15).

4. A fryer for cooking food according to claim 1, wherein said basket (4) is capable of rotation around said tilted axis (15).

5. A fryer for cooking food according to claim 1, wherein said blade (14) and said basket (4) are capable of rotating simultaneously in the same or in opposite directions.

6. A fryer for cooking food according to claim 1, wherein said blade (14) and said basket (4) have the same rate of rotation.

7. A fryer for cooking food according to claim 1, wherein said blade (14) and said basket (4) have a different rate of rotation.

8. A fryer for cooking food according to claim 1, wherein said rotator comprises a motorized pin (21) for driving the rotation of said blade (14).

9. A fryer for cooking food according to claim 1, wherein said rotator comprises a converter for converting the rotation of said mixer blade (14) into a concordant or discordant, coaxial rotation of said basket (4).

10. A fryer for cooking food according to claim 9, wherein said converter comprises a planetary gear (55).

11. A fryer for cooking food according to claim 9, wherein said converter comprises a freewheel mechanism (54) that connects said blade (14) to said basket (3).

12. A fryer for cooking food according to claim 1, wherein said basket (4) comprises openings (11) coinciding with at least a portion (10) located in line with said lower angular portion (9) of said tank (3).

13. A method for cooking food in a moderate volume of oil with a fryer of the type comprising a main body (1), a tank (3) tilted suitably so as to collect said volume of oil (7) in its bottom angular portion (9), a lid (5) and a heater (6), the method comprising:
   placing a basket (4) inside said tank (3), and a mixer blade (14) inside said basket (4), and making said basket (4) and said mixer blade (14) rotate selectively or in combination in order to repeatedly extract and immerse said food contained in said basket (4) in said volume of oil (7) and to apply a film of oil on the portion of the bottom of said basket (4) above said volume of oil (7) so as to submit said food to a combined cooking action due at least to said volume of oil (7) and to said bottom of said basket (4), including said portion outside said volume of oil (7);
   closing the lid (5) to define, together with said tank (3), a chamber (13) containing a volume of air (8) to which said heater (6) directly or indirectly transmits thermal energy to complete said combined cooking action, said heater (6) comprises at least one electric heating element located underneath a bottom portion (12) of said tank (3), the fryer further comprises at least one fan integrated in the lid (5) for inducing forced circulation of a flow of hot air through said tank (3), said heater (6) comprising at least one electric heating element positioned in front of said fan so as to heat said flow of hot air, wherein the hot air flow directly cooks said portion of food, which is outside said volume of oil (7).

14. A method for cooking food in a moderate volume of oil according to claim 13, wherein said combined cooking action is also achieved by forced circulation of a flow of hot air through said tank (3).

\* \* \* \* \*